United States Patent
Shimizu

(10) Patent No.: US 8,030,815 B2
(45) Date of Patent: Oct. 4, 2011

(54) BRUSHLESS MOTOR HAVING IMPROVED MOUNTING PLATE

(75) Inventor: Michihiro Shimizu, Tottori (JP)

(73) Assignee: Minebea Motor Manufacturing Corporation, Tokyo (JP)

( * ) Notice: Subject to any disclaimer, the term of this patent is extended or adjusted under 35 U.S.C. 154(b) by 26 days.

(21) Appl. No.: 12/092,847

(22) PCT Filed: Dec. 22, 2006

(86) PCT No.: PCT/JP2006/325592
§ 371 (c)(1),
(2), (4) Date: May 7, 2008

(87) PCT Pub. No.: WO2007/077758
PCT Pub. Date: Jul. 12, 2007

(65) Prior Publication Data
US 2009/0289515 A1   Nov. 26, 2009

(30) Foreign Application Priority Data
Jan. 6, 2006   (JP) ................. 2006-001153

(51) Int. Cl.
*H02K 5/00*   (2006.01)
*H02K 5/10*   (2006.01)
*H02K 5/12*   (2006.01)
*H02K 5/16*   (2006.01)

(52) U.S. Cl. ............. 310/91; 310/85; 310/89; 310/90; 310/90.5

(58) Field of Classification Search ............ 310/85, 310/89–91; *H02K 5/00, 5/10, 5/12, 5/16*
See application file for complete search history.

(56) References Cited

U.S. PATENT DOCUMENTS

| | | | | |
|---|---|---|---|---|
| 4,357,552 A | * | 11/1982 | MacMillan | 310/90 |
| 5,497,040 A | * | 3/1996 | Sato | 310/67 R |
| 6,707,203 B2 | * | 3/2004 | Wickham | 310/91 |
| 7,977,836 B2 | * | 7/2011 | Chou | 310/90 |
| 2005/0035673 A1 | * | 2/2005 | Lafontaine et al. | 310/58 |
| 2005/0264113 A1 | * | 12/2005 | Suzuki et al. | 310/80 |
| 2006/0091749 A1 | * | 5/2006 | Chou | 310/90 |
| 2007/0012671 A1 | * | 1/2007 | Hiraoka et al. | 219/130.51 |

FOREIGN PATENT DOCUMENTS

| | | |
|---|---|---|
| JP | 53-83606 | 7/1978 |
| JP | 09317824 | * 12/1997 |
| JP | 11-089196 | 3/1999 |
| JP | 2004-254439 A | 9/2004 |
| JP | 2005-98285 A | 4/2005 |

OTHER PUBLICATIONS

Machine translation of JP09317824, Uekusa, Dec. 1997.*
International Search Report for PCT/JP2006/325592, dated Feb. 27, 2007.

* cited by examiner

*Primary Examiner* — Quyen Leung
*Assistant Examiner* — Terrance Kenerly
(74) *Attorney, Agent, or Firm* — RatnerPrestia

(57) ABSTRACT

A brushless motor to be used for driving a vane pump, which is employed in a module for inspecting vapor leakage of fuel, is disclosed. The brushless motor includes a mounting plate having a through hole, and an annular space is formed between an inner wall of the through hole and an outer wall of a projection of a motor housing. This annular space allows preventing a welding current from flowing into the projection.

2 Claims, 4 Drawing Sheets

US 8,030,815 B2

BRUSHLESS MOTOR HAVING IMPROVED MOUNTING PLATE

This application is a U.S. National Phase Application of PCT International Application PCT/JP2006/325592.

TECHNICAL FIELD

The present invention relates to a brushless motor, more particularly it relates to a brushless motor for driving a vane pump to be used in an inspection module for detecting vapor leakage of fuel.

BACKGROUND ART

FIG. 6 shows a sectional view of a conventional vane pump, which is used in an inspection module for inspecting vapor leakage of fuel from a fuel tank. The vane pump thus employs a brushless motor having no commutating brush.

In FIG. 6, brushless motor 631 includes mounting plate 637 made of metal. Casing 622 of the vane pump is rigidly mounted to plate 637 with bolt 651. Motor housing 632 made of metal plate accommodates rotor 634 and stator 635 of brushless motor 631. Motor shaft 634a is connected to rotor shaft 623a of the vane pump. Motor housing 632 includes cylindrical projection 632a at the center of its top face. Bearing 633 is fixed to an inner wall of projection 632a.

Mounting plate 637 includes through hole 637a extending along an outer wall of projection 632a, and is fixed to the top face of motor housing 632 by fitting the outer wall of projection 632a into through hole 637a. A structure of the foregoing brushless motor is preferably referred to, e.g. patent document 1.

The conventional brushless motor discussed above; however, has a following problem: When mounting plate 637 is fixed to motor housing 632 at the center of the top face of housing 632 by electrical spot welding, the welding current flows into projection 632a through the contact between projection 632a and the inner wall of through hole 637a, so that bearing 633 can be damaged.

Patent Document 1: Unexamined Japanese Patent Publication No. 2005-98285 (page 5-6, and FIG. 1)

DISCLOSURE OF INVENTION

A brushless motor of the present invention comprises the following elements:
 a motor housing having a cylindrical projection at the center of its top face and accommodating a stator and a rotor; and
 a mounting plate including a through hole having a greater diameter than a diameter across an outer wall of the projection for forming an annular space between an inner wall of the through hole and the outer wall of the projection, and being fixed to the top face of the motor housing.

When the mounting plate is fixed to the top face of the motor housing by spot welding, the annular space prevents a welding current from flowing into the projection.

Figure 1:
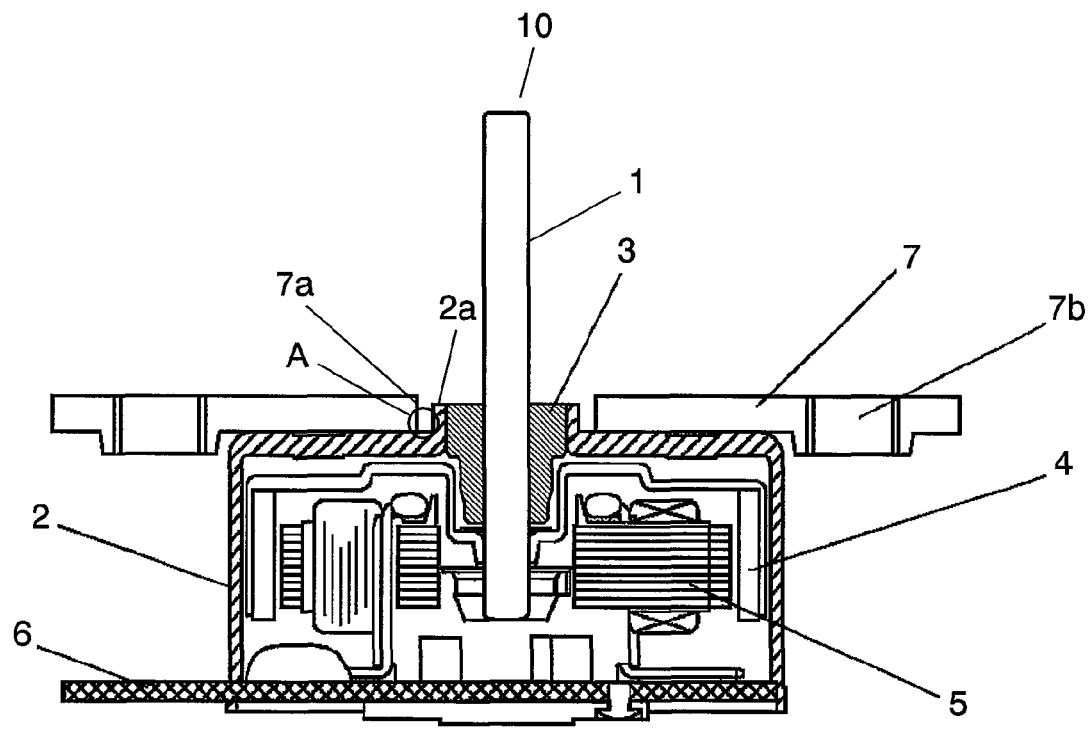
FIG. 1 shows a sectional view of a brushless motor in accordance with a first embodiment of the present invention.

DESCRIPTION OF REFERENCE MARKS 1 motor shaft
2 motor housing
2a projection of motor housing
3 bearing
4 rotor
5 stator
6 control circuit
7 mounting plate
7a through hole of mounting plate
10 brushless motor
41 contact-type sealing member
41c foot of contact-type sealing member

DESCRIPTION OF PREFERRED EMBODIMENTS

Exemplary embodiments of the present invention are demonstrated hereinafter with reference to the accompanying drawings.

Embodiment 1

Figure 2:
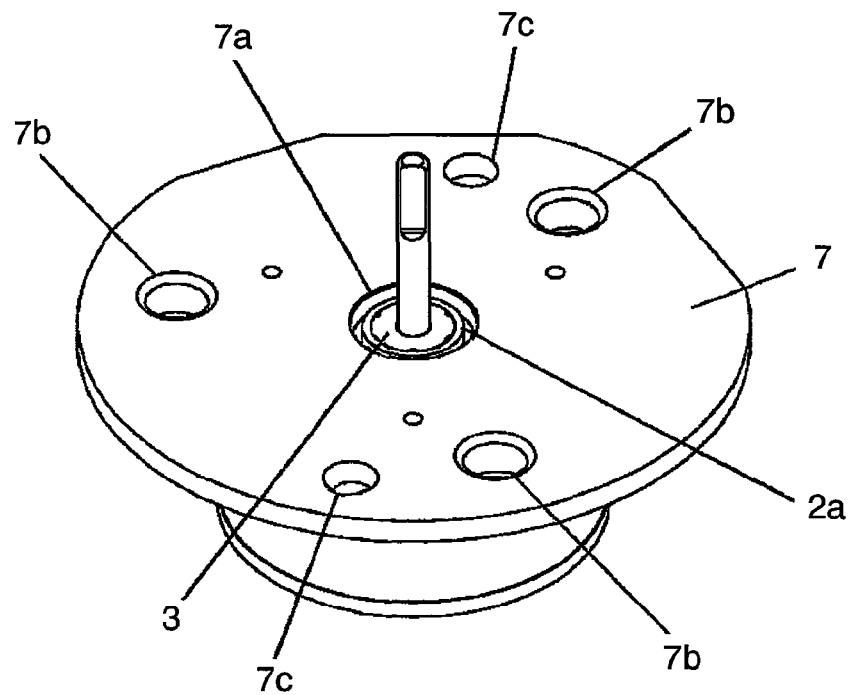
FIG. 2 shows a perspective view of the brushless motor shown in FIG. 1.

FIG. 1 shows a sectional view of a brushless motor in accordance with the first embodiment, and FIG. 2 shows a perspective view of the brushless motor shown in FIG. 1. Brushless motor 10 comprising the following elements:
 motor shaft 1;
 cylindrical motor housing 2;
 bearing 3;
 rotor 4;
 stator 5;
 control circuit 6; and
 mounting plate 7.

Motor housing 2 made of metal includes cylindrical projection 2a at the center of its top face. Rotor 4 and stator 5 are accommodated in housing 2. Bearing 3 is fixed to an inner wall of projection 2a. Rotor 4 includes motor shaft 1 and a frame shaped like a cup, and permanent magnets are mounted to this frame. Bearing 3 supports motor shaft 1 rotatably, and control circuit 6 powers stator 5 so that rotor 4 can rotate.

As shown in FIGS. 1 and 2, mounting plate 7 made of metal includes through hole 7a having a greater diameter than a diameter across the outer wall of projection 2a, tapped hole 7b, positioning hole 7c to be used in a manufacturing step. Annular space A is formed between an inner wall of through hole 7a and the outer wall of projection 2a so that mounting plate 7 can be fixed to the top face of motor housing 2.

Figure 3A:
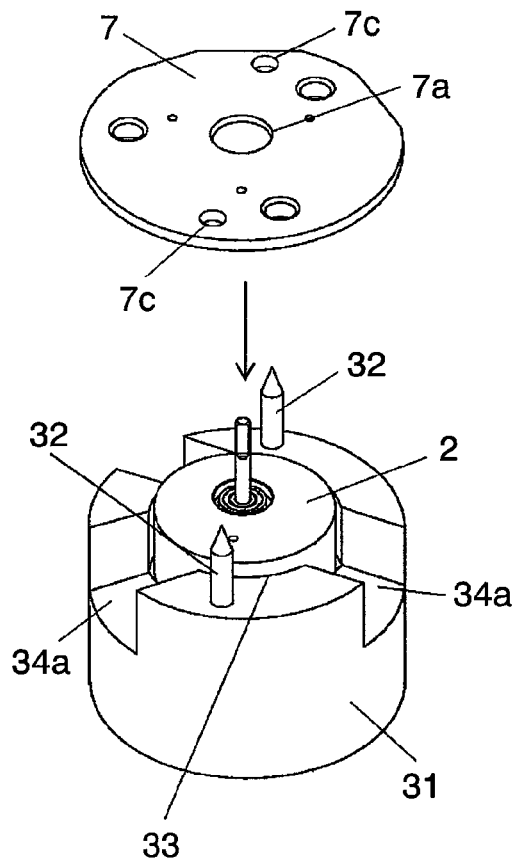
FIG. 3A shows a process of spot welding which fixes a mounting plate to a top face of a motor housing.
Figure 3B:
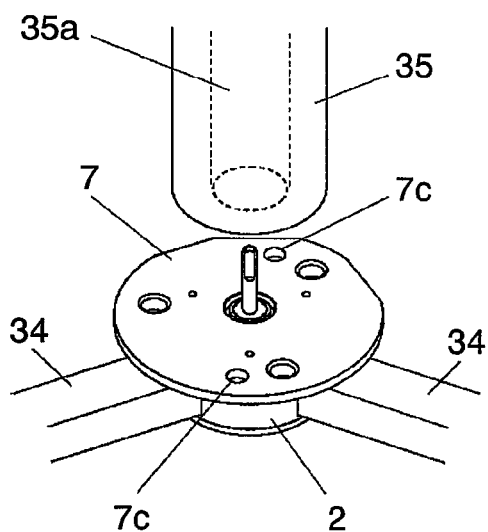
FIG. 3B shows a process of spot welding which fixes the mounting plate to the top face of the motor housing.
Figure 3C:
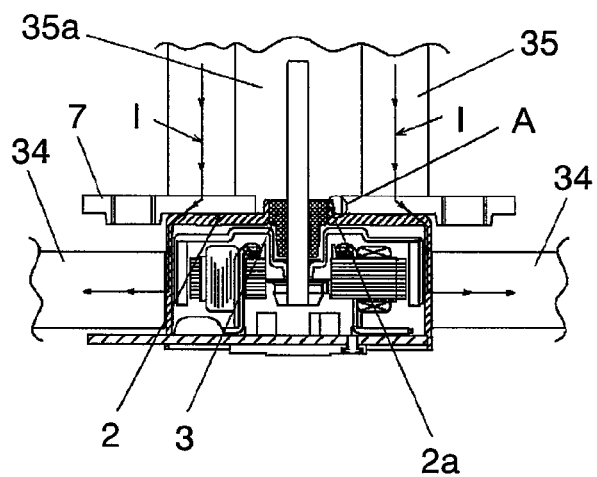
FIG. 3C shows a process of spot welding which fixes the mounting plate to the top face of the motor housing.

FIG. 3A-FIG. 3C show the process of electrical spot welding which fixes mounting plate 7 to the top face of motor housing 2. The process includes the steps of:

(1) inserting motor housing 2 into jig 31 (refer to FIG. 3A);
(2) placing mounting plate 7 onto the top face of motor housing 2 with positioning hole 7c fitting onto positioning pin 32 of jig 31 (refer to FIG. 3B); and
(3) inserting anodic (or cathodic) welding electrode 34 into electrode insertion groove 34a of jig 31 for bringing electrode 34 into contact with the outer wall of motor housing 2 (refer to FIGS. 3A and 3B);
(4) moving cathodic (or anodic) welding electrode 35 downward to contact with mounting plate 7. Electrode 35 includes hole 35a which gets away from motor shaft 1 (refer to FIGS. 3B and 3C); and
(5) feeding a welding current between welding electrodes 34 and 35 (refer to FIG. 3C).

FIG. 3C shows flowing path I of the welding current. Annular space A isolates mounting plate 7 from projection 2a, thereby preventing the welding current from flowing into projection 2a. As a result, bearing 3 can be free from a damage caused by the welding current.

Embodiment 2

Figure 4:
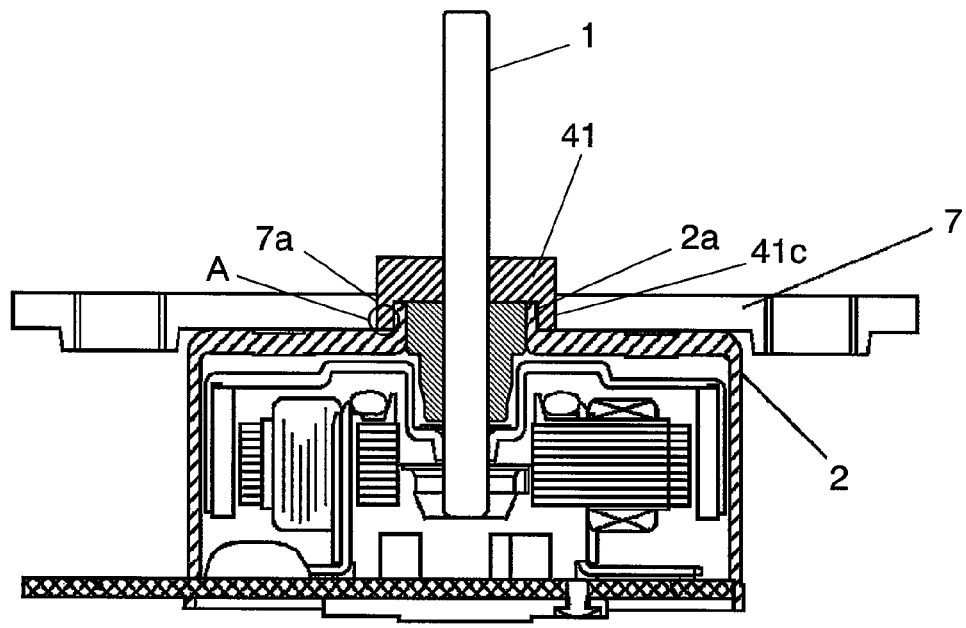
FIG. 4 shows a sectional view of a brushless motor in accordance with a second embodiment of the present invention.
Figure 5:
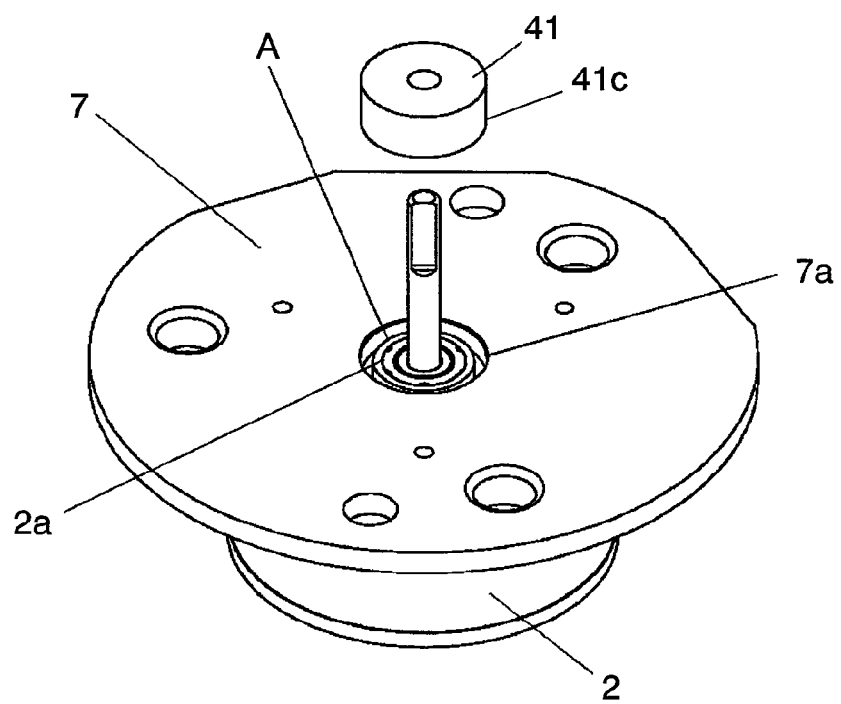
FIG. 5 shows a process of mounting a contact-type sealing member on a motor shaft.
Figure 6:
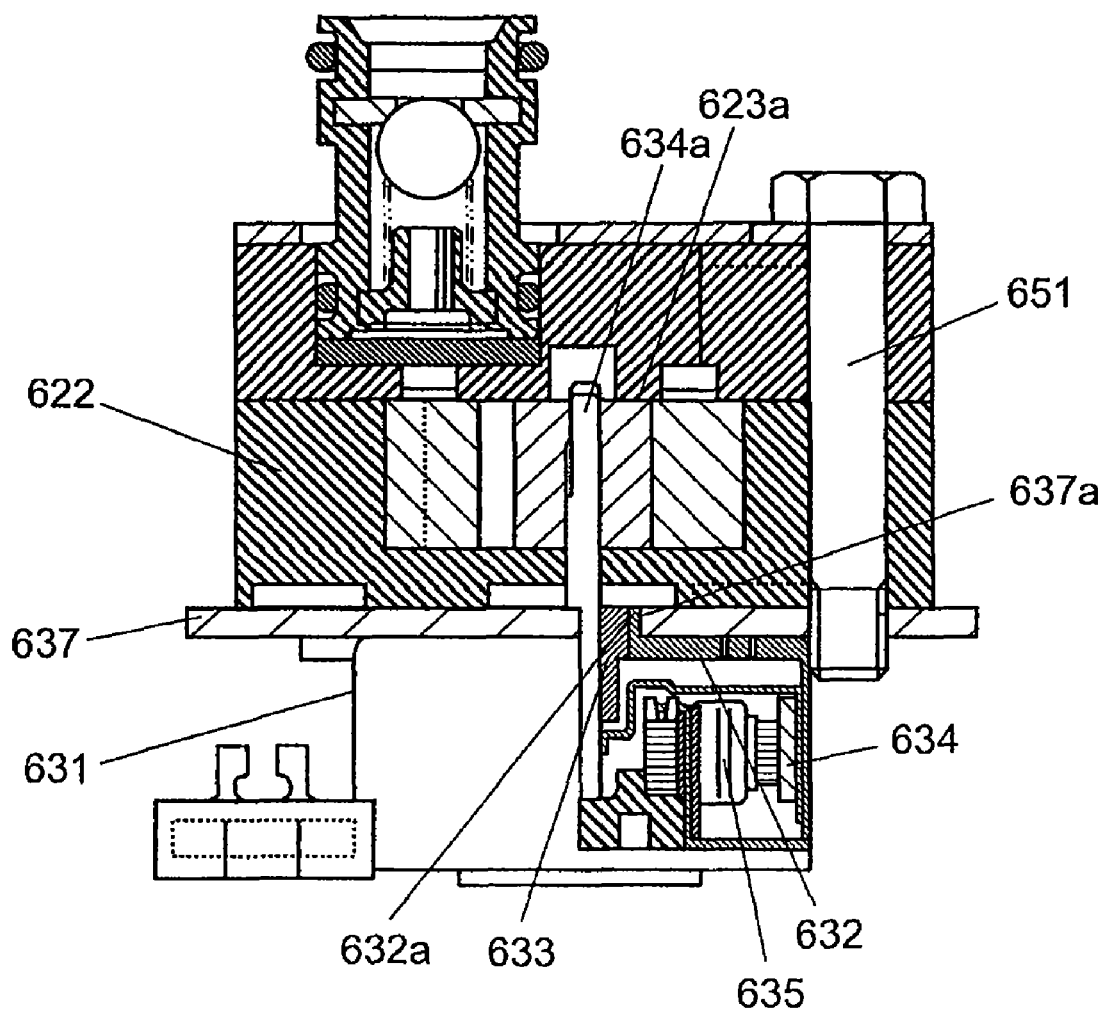
FIG. 6 shows a sectional view of a conventional vane pump.

FIG. 4 shows a sectional view of a brushless motor in accordance with the second embodiment. As shown in FIG. 4, cup-shaped contact-type sealing member 41 is mounted on motor shaft 1. Sealing member 41 is made of elastic material such as rubber. FIG. 5 shows a process of mounting contact-type sealing member 41 on motor shaft 1.

As shown in FIGS. 4 and 5, contact-type sealing member 41 is mounted on motor shaft 1 such that foot 41c is inserted into and fixed at annular space A formed between through hole 7a and projection 2a of motor housing 2, thereby covering projection 2a. Sealing member 41 prevents gas or lubricant from flowing between the brushless motor and the vane pump.

Since contact-type sealing member 41 is mounted using annular space A, the height projected from mounting plate 7 is small, so that a recess which is engraved on a casing of the vane pump in order to get away from a projection of sealing member 41, can be shallow. As a result, the structure discussed above can ensure the strength of the casing of the vane pump.

Industrial Applicability

A brushless motor of the present invention is useful as a motor for driving a vane pump to be used in an inspection module for inspecting vapor leakage of fuel. ace allows preventing a welding current from flowing into the projection.

The invention claimed is:
1. A brushless motor comprising:
a stator;
a rotor including a motor shaft;
a cylindrical motor housing having a bottom, the motor housing including a cylindrical projection at a center of a mounting surface of the bottom, the motor housing containing the stator and the rotor therein;
a bearing, fixed to an inner wall of the projection, for supporting the motor shaft rotatably; and
a mounting plate including a through hole, which has a greater diameter than a diameter across an outer wall of the projection and forms an annular space between an inner wall of the through hole and the outer wall of the projection, the mounting plate being electrically spot welded to the mounting surface of the bottom of the motor housing, an isolating portion being formed by the annular space which isolates the projection and the mounting plate.
2. The brushless motor of claim 1, wherein the mounting plate further comprises a positioning hole.

* * * * *